United States Patent Office 3,460,984
Patented Aug. 12, 1969

3,460,984
PROCESS FOR THE MANUFACTURE OF
MAGNETIZABLE RECORDING LAYERS
Johan Heinrich Bisschops, Berchem-Antwerp, Jozef Frans Willems, Wilrijk-Antwerp, and Willy Karel van Landeghem, St. Gillis-Waas, Belgium, assignors to Gevaert-Agfa N.V., Mortsel, Belgium, a Belgian company
No Drawing. Filed Aug. 16, 1965, Ser. No. 480,168
Claims priority, application Great Britain, Aug. 24, 1964, 34,491/64
Int. Cl. C09d 3/48; C08d 13/24; B44d 1/22
U.S. Cl. 117—161                                8 Claims

ABSTRACT OF THE DISCLOSURE

In the manufacture of magnetic recording media, e.g. tape, in which acid-absorbing magnetizable particles are dispersed in a solvent solution containing a cross-linkable polymeric binding agent, the improvement of using a polymeric dispersing agent including lipophilic functional groups, acid groups, and hydroxyl groups whereby the polymeric dispersing agent and the polymeric binding agent can be cross-linked together. Preferably, the agents are cross-linked by means of an aldehyde or polyisocyanate curing agent.

---

This invention is concerned with a process for the manufacture of magnetizable recording layers and with magnetizable recording layers prepared according to said process.

When preparing magnetizable recording layers containing magnetizable particles in a binder, the object is to make the distribution of the magnetizable material in the binder as homogeneous as possible and to obtain a very strong cohesion between the binder and the dispersed material.

It is of paramount importance for the faithful recording and reproduction of the signals and for obtaining a recording layer with low noise level, that the highest possible homogeneity is reached in the dispersion of the magnetizable material in the binder.

A strong anchoring of the magnetizable material in the recording layer with the smallest possible amount of binder makes the sensitivity of the recording layer increase whereas the chances for "drop outs" remain low.

From the Dutch patent specification No. 85,823 a process is known for the distribution of an inorganic powder in an organic liquid. This process is applied to the manufacture of a magnetic sound recording layer. This process is characterized by the treatment of the inorganic powder to be distributed with an organic phosphorus compound such as a monophosphate, a dialkyl phosphate, an aryl phosphate or aralkyl phosphate or a monophosphonic acid or dialkylphosphonic acid, arylphosphonic acid or aralkylphosphonic acid, in which the phosphorus atom bears at least one acid function. The action of the organic phosphorus compounds presumably resides in the strong bonding of the acid groups in the molecule at the surface of the inorganic compound.

It has been found now that a polymer capable of being cross-linked and containing lipophilic structure units and acid groups is very suited for the manufacture of magnetic recording materials since it possesses good dispersing properties for the normally used magnetic susceptible pigments which are inorganic materials having the property of absorbing acids, and since this polymer can be built in by cross-linking it together with the dispersed inorganic material in a binder.

Polymers, containing acid groups such as carboxylic acid groups and/or acid groups derived from the oxy acids of phosphorus and/or sulphur are utilized preferably.

The structural composition of the organic lipophilic part of the polymer chains substantially determines the degree of appropriateness as a dispersing agent in a particular organic solvent and further determines the possibility of cross-linking either with polymer chains of similar type or with polymer chains of the polymeric binder.

Appropriate dispersing polymers are i.a. polyesters substituted with acid groups and containing aliphatic and/or aromatic and/or araliphatic structural units having a linear or branched nature, linear or branched polyethers containing acid groups and furthermore vinyl copolymers with acid and hydroxyl groups such as i.a. copoly(vinyl alcohol/methacrylic acid).

The polymeric dispersing agents are adsorbed with the acid groups to the inorganic particles. The normally used magnetizable particles adsorb 4 to 10 milliequivalent of acid per 100 g. As inorganic materials having a suitable acid-adsorbing capacity are especially mentioned basic metal oxides and metal particles.

Care should be taken in that not more of the polymeric dispersing agent is employed than can be bounded by adsorption of the acid radicals to the inorganic material.

For preparing magnetizable recording layers according to the present invention preferably polymeric acid dispersing agents containing reactive groups, e.g. hydroxyl groups, for cross-linking are utilized.

The preparation of some polymers containing acid groups and hydroxyl groups is presented now by way of illustration.

PREPARATION 1

An amount of 6000 g. of a polyester resulting from the condensation of 2.5 mole of adipic acid, 0.5 mole of orthophthalic acid and 4 mole of trimethylolpropane and characterized by a hydroxyl content of 9% by weight, a water content lower than 0.15% and a viscosity at 75° C. of 300 cps. is dried in vacuo (10 mm. Hg) for 2 hours at 120° C.

To the dried polyester are added 1644 g. of diethyl phosphite and 1.2 g. of zinc acetate as a catalyst. The reaction mixture is then heated to 170° C. for 3 hours while stirring and while 800 ccs. of ethanol are distilled off during this period.

Next, the reaction mixture is placed in vacuo for 30 minutes in order to collect non-reacted diethyl phosphite from the highly viscous final product.

The determination of the acid proportion of the final product by potentiometric titration yields 0.75 milliequivalent per gram. The number of unesterified hydroxyl groups is 25%.

PREPARATION 2

An amount of 500 g. of the polyester dried and composed as described in Preparation 1 is made to react for 4 hours with 98 g. of phthalic anhydride at 120° C.

The determination of the acid proportion of the final product yields 1.14 milliequivalents per gram.

The number of unesterified hydroxyl groups is 75%.

PREPARATION 3

In a flask installed in a water bath and fitted with a stirrer, a cooler, a thermometer, a dropping funnel and a nitrogen inlet are placed 400 ccs. of anhydrous benzene and 50 g. of the polyester described in Preparation 1. The obtained solution is cooled to 4° C. and without exceeding the temperature of 5° C., 15.3 g. of chlorosulphonic acid are added dropwise whilst stirring. Hydrogen chloride escapes together with nitrogen gas conducted through the reaction mixture. In order to prevent the intrusion of humidity into the reaction mixture the cooler and dropping funnel are provided with a calcium chloride tube.

The reaction mixture is kept at 4° C. for 12 hours. Next, the benzene is distilled off by heating to 90° C. and the reaction product is subjected for 1 hour to the vacuum produced by a water jet pump.

The determination of the acid proportion of the final product yields 2.05 milliequivalents of acid per gram. The number of unesterified hydroxyl groups is 50%.

PREPARATION 4

An amount of 100 g. of polyethylene glycol with an average molecular weight of 1000 is dried in vacuo (6 mm. Hg) for 2 hours at 150° C. The dried polyethylene glycol is made to react for 4 hours at 180° C. under nitrogen atmosphere with 19.2 g. of trimellitic anhydride.

The determination of the acid proportion of the final product yields 1.6 milliequivalents of acid per gram. The number of unesterified hydroxyl groups is 50%.

The use of acid polymers capable of being cross-linked and acting as a dispersing agent for acid-absorbing pigments such as e.g. magnetizable metal oxides, metals or alloys not only offer the advantage that these pigments are distributed very homogeneously in the binder of the recording layer, but also that the pigment particles are strongly bonded with the binder since on the one hand the pigment is linked by the adsorption of the acid groups with the dispersing polymer, and since on the other hand the dispersing polymer is cross-linked with the polymers of the binder and as such is built in the network of the cross-linked binder.

The strong anchoring of the pigment in the binder is particularly important for pigment binder layers, which after the manufacture are exposed to wear such as magnetizable recording layers during their use in the recording apparatus.

Magnetizable pigments which are utilized preferably in the process for the manufacture of magnetizable recording layers according to the present invention are $\gamma$-$Fe_2O_3$, $CrO_2$ and magnetizable metal- and metal alloy particles.

An appropriate selection of the lipophilic part of the dispersing polymer offers the possibility for dispersing the acid-adsorbing inorganic powder in various organic solvents. Appropriate solvents for the preparation of magnetizable recording layers according to the present invention are e.g. 1,2-dichloroethane, methyl ethyl ketone and ethanol.

For preparing the magnetic recording layers according to the present invention it is preferred to first dissolve the acid-dispersing polymer in an organic liquid, which acts as a solvent for the polymeric binder, and subseqently to disperse the magnetically susceptible particles and to dissolve the binder therein. Dispersing requires no special high-quality mechanical stirring devices and may be performed e.g. by grinding in a ball mill.

For dispersing $\gamma$-$Fe_2O_3$ preferably use is made of a polymer with acid phosphite groups such as i.a. the polymers described in the Belgian patent specification No. 602,498. The polymer preferably comprises groups with active hydrogen atoms e.g. hydroxyl groups, which can be utilized in cross-linking reactions with polyisocyanates or in reactions in which cross-linging occurs with aldehydes such as formaldehyde or compounds splitting off aldehyde. Different embodiments of the cross-linking of polymers in magnetizable pigment layers are stated i.a. in our Belgian patent specification No. 608,342, our U.S. patent application No. 252,589, in our U.S. patent application No. 377,508 and in the literature and patent specifications referred to therein.

The coating of the magnetizable dispersion on a suited support as well as the evaporation of the solvent and the hardening of the dispersion layer can proceed according to common techniques. Together with the dispersing polymer, the dispersion preferably incorporates as binding agents polymers which can be hardened by the influence of an acid catalyst as described in our U.S. patent application No. 377,508, now Patent No. 3,366,505 issued Jan. 30, 1968.

It is obvious that the dispersing technique according to the present invention can be applied successfully to the preparation of paint suspensions and the manufacture of paint layers, which are most resistant to wear.

The following examples illustrate the invention. All the parts and percentages are by weight.

Example 1

A mixture comprising the following ingredients is ground in a ball mill for 48 hours:

100 parts of needle-shaped $\gamma$-$Fe_2O_3$
4 parts in dispersing polymer prepared as described in Preparation 1
12.5 parts of partially hydrolyzed copoly(vinyl-chloride/vinyl acetate) comprising 2.3% of free hydroxyl groups and 3% of vinyl acetate groups
200 parts of 1,2-dichloroethane.

The following products are added to this mixture:

10.5 parts of polyesteramide modified with polyisocyanate resulting from the reaction of 4 parts of hexamethylene diisocyanate with 100 parts of a polyesteramide, which is prepared by condensing 7.5 mole of ethylene glycol, 9 mole of adipic acid and 1.5 mole of ethanolamine
125 parts of 1,2-dichloroethane.

Grinding is continued for 24 hours. A mixture of 6 parts of a 75% solution of the reaction product of 1 mole of 1,3,6-hexanetriol and 3 mole of hexamethylene diisocyanate in 1,2-dichloroethane is added to the above mixture.

The resulting dispersion is applied to a polyethylene terephthalate support and dried thereon at 120° C. The thickness of the dry recording layer is 10$\mu$.

Example 2

The preparation of the recording layer proceeds as described in Example 1. However, 4 parts of the dispersing polymer of Preparation 1 are replaced by 4 parts of dispersing polymer described in Preparation 2.

Example 3

A mixture comprising the following ingredients is ground in a ball mill for 40 hours:

100 parts of needle-shaped $\gamma$-$Fe_2O_3$
4 parts of dispersing polymer prepared as described in Preparation 1
4 parts of polyvinylbutyral containing 88% of vinylbutyal groups, 2.5% of vinyl acetate groups and 9.5% of vinyl alcohol groups
240 parts of 1,2-dichloroethane.

To this mixture are added successively the following ingredients:

12 parts of the above-mentioned polyvinylbutyral
74 parts of 1,2-dichloroethane.

Grinding is continued for 20 hours. An amount of 5.1 parts of a 75% solution of the reaction product of hexanetriol and hexamethylene diisocyanate in 1,2-dichloroethane is mixed with the resulting dispersion.

This dispersion is then applied according to known methods to a polyethylene terephthalate support and dried thereon at 120° C. The thickness of the dry recording layer is 10$\mu$.

Example 4

A mixture comprising the following ingredients is ground in a ball mill for 48 hours:

100 parts of needle-shaped $\gamma$-$Fe_2O_3$
4 parts of dispersing polymer prepared as described in Preparation 1
12.5 parts of partially hydrolyzed copoly(vinyl chloride/vinyl acetate) comprising 2.3% of free hydroxyl groups and 3% of vinyl acetate groups
200 parts of 1,2-dichloroethane.

The following products are added to this mixture:

10.5 parts of a polyesteramide modified with polyisocyanate resulting from the reaction of 5 parts of hexamethylene diisocyanate with 100 parts of a polyesteramide, which is prepared by condensing 7.5 mole of ethylene glycol, 9 mole of adipic acid, and 1.5 mole of ethanolamine
125 parts of 1,2-dichloroethane
2.7 parts of hexamethoxymethylmelamine.

Grinding is continued for 24 hours and the resulting dispersion is filtered and deaerated. Subsequently the dispersion is applied to a polyethylene terephthalate support of 35μ by means of a doctor knife in such a way that the thickness of the layer upon drying measures 10μ. Then the dispersion layer is dried for 2 minutes at 80° C. To the dry dispersion layer are applied per sq. m. according to the kiss coating system 10 ccs. of a 2% solution of paratoluene sulphonic acid in methanol. After drying at 80° C. for 1 minute the magnetizable recording layer is found to be insolubilized and very wear-resistant at its surface.

Example 5

A mixture comprising the following ingredients is ground in a ball mill for 48 hours:

100 parts of needle-shaped $\gamma$-$Fe_2O_3$
4 parts of dispersing polymer prepared as described in Preparation 1
12.5 parts of partially hydrolyzed copoly(vinyl chloride/vinyl acetate) comprising 2.3% of free hydroxyl groups and 3% of vinyl acetate groups
200 parts of 1,2-dichloroethane.

The following products are added to this mixture:

10.5 parts of polyesteramide modified with polyisocyanate resulting from the reaction of 5 parts of hexamethylene diisocyanate with 100 parts of a polyesteramide, which is prepared by condensing 7.5 mole of ethylene glycol, 9 mole of adipic acid and 1.5 mole of ethanolamine
125 parts of 1,2-dichloroethane.

Grinding is continued for 24 hours and to the dispersion are added 17 g. of the addition product of 2,4-toluene diisocyanate and the ester of malonic acid and polyethylene glycol monolaurate (the average molecular weight of the polyglycol being 400) as a latent polyisocyanate. The resulting dispersion is applied to a polyethylene terephthalate support, which has been covered previously with a subbing layer of copoly(acrylonitrile/vinylidene chloride) (5/95).

Immediately after coating, the recording layer while still humid is conducted through a solenoid with a field capacity of 1000 oe. in order to direct the magnetic particles.

After evaporation of the solvent the thickness of the recording layer is 12μ.

Subsequently the recording material is calendered at 80° C. the recording layer being in contact with a polished chrome cylinder. The pressure exerted on the tangent between the chrome cylinder and the pressure roller covered with paper is 100 kg./cm. The calendered recording layer is heated for 1 min. at 140° C. by means of an infra-red radiation apparatus, thus causing the polyisocyanate to split off from the above-mentioned addition product and involving the curing of the binder.

We claim:
1. Process for the manufacture of magnetic recording material comprising the steps of:
   (1) dispersing finely-divided acid-absorbing magnetizable particles in a solvent solution containing at least one polymeric binding agent containing reactive groups capable of being cross-linked with an aldehyde or a polyisocyanate, said dispersing step being carried out in the presence of a polymeric dispersing agent containing (a) aliphatic, aromatic, or araliphatic lipophilic groups, (b) free hydroxyl groups, and (c) acid groups of the class consisting of carboxyl and acid groups derived from the oxyacids of phosphorus and sulfur;
   (2) coating a layer of said dispersion onto a support; and
   (3) causing said polymeric binding agent to be cross-linked with said polymeric dispersing agent.

2. Process according to claim 1, wherein the cross-linking reaction is a curing reaction using an aldehyde or polyisocyanate as curing agent.

3. Process according to claim 1, wherein the dispersing step is carried out with an amount of dispersing agent not exceeding the amount that can be adsorbed by the magnetizable particles.

4. Process according to claim 3, wherein the dispersing agent is used in an amount of 4 to 10 milliequivalent in respect of the acid groups per 100 g. of magnetizable particles.

5. Process according to claim 1, wherein as acid-adsorbing magnetizable particles $\gamma$-$Fe_2O_3$ particles are dispersed.

6. Process according to claim 1, wherein as dispersing agent a reaction product is used of a dialkyl ester of phosphorus acid, a polycarboxylic acid and a polyhydroxy compound, which reaction product contains free hydroxyl groups and acidic phosphorus ester groups.

7. Process according to claim 6, wherein the binder comprises a copoly(vinyl chloride/vinyl acetate/vinyl alcohol) and a polyesteramide modified with a polyisocyanate which can be cured with formaldehyde.

8. The magnetizable recording material produced by the method of claim 1.

References Cited
UNITED STATES PATENTS

| | | | |
|---|---|---|---|
| 3,144,352 | 8/1964 | Talley | 252—62.54 |
| 3,150,995 | 9/1964 | Bauer | 252—62.54 |
| 3,216,846 | 11/1965 | Hendricx | 252—62.54 |
| 3,262,813 | 7/1966 | Flowers | 252—62.54 |

FOREIGN PATENTS 766,484  1/1957  Great Britain.

TOBIAS E. LEVON, Primary Examiner
J. COOPER, Assistant Examiner

U.S. Cl. X.R.
117—121, 138, 161; 252—62